United States Patent
Reponen et al.

(10) Patent No.: US 9,448,621 B2
(45) Date of Patent: Sep. 20, 2016

(54) CAUSATION OF DISPLAY OF INFORMATION ON A SEE THROUGH DISPLAY

(71) Applicant: Nokia Technologies Oy, Espoo (FI)

(72) Inventors: Erika Reponen, Tampere (FI); Toni Jarvenpaa, Akaa (FI)

(73) Assignee: Nokia Technologies Oy, Espoo (FI)

( * ) Notice: Subject to any disclaimer, the term of this patent is extended or adjusted under 35 U.S.C. 154(b) by 62 days.

(21) Appl. No.: 14/137,036

(22) Filed: Dec. 20, 2013

(65) Prior Publication Data

US 2015/0177825 A1    Jun. 25, 2015

(51) Int. Cl.
| | |
|---|---|
| G06F 3/00 | (2006.01) |
| G04G 9/00 | (2006.01) |
| G06T 1/20 | (2006.01) |
| G06T 1/60 | (2006.01) |
| G06F 1/16 | (2006.01) |
| G06F 3/03 | (2006.01) |
| G06F 3/0346 | (2013.01) |

(52) U.S. Cl.
CPC .............. *G06F 3/005* (2013.01); *G04G 9/007* (2013.01); *G06F 1/163* (2013.01); *G06F 3/0304* (2013.01); *G06T 1/20* (2013.01); *G06T 1/60* (2013.01); *G06F 3/0346* (2013.01); *G06F 2203/04804* (2013.01)

(58) Field of Classification Search
CPC .... G06F 3/011; G06F 3/0425; G06F 3/0428; G06F 3/1431; G06F 3/04883; G06F 1/1626; G06F 1/1616; G06F 1/1643; G06F 3/041; G06F 1/1647; G06F 2203/04808; G06F 3/0486; G06F 1/1649; G06F 3/04815; G06F 3/0488; G06F 1/1632; G06F 3/0412; G06F 3/044; G06F 3/04886; G06F 3/0346; G06F 2203/04804
See application file for complete search history.

(56) References Cited

U.S. PATENT DOCUMENTS

| | | |
|---|---|---|
| 8,179,604 B1 | 5/2012 | Gomez et al. |
| 8,427,396 B1 * | 4/2013 | Kim ..................... G06F 3/1454 345/8 |
| 8,482,527 B1 | 7/2013 | Kim |
| 2007/0239877 A1 | 10/2007 | Uchida |
| 2012/0256886 A1 * | 10/2012 | Ryu et al. .................... 345/204 |

(Continued)

FOREIGN PATENT DOCUMENTS

EP    2293531 A1    3/2011

OTHER PUBLICATIONS

"ARhrrrr—An Augmented Reality Shooter," https://www.youtube.com/watch?v=cNu4CluFOcw, a Project from George Tech and SCAD—Atlanta, uploaded Jun. 11, 2009, 1 page.

(Continued)

*Primary Examiner* — Md Saiful A Siddiqui
(74) *Attorney, Agent, or Firm* — Banner & Witcoff, Ltd.

(57) ABSTRACT

A method comprising receiving visual identification information from a separate apparatus, identifying the separate apparatus based, at least in part, on camera visual information and the visual identification information, determining that the separate apparatus is perceivable through a see through display, and causing display of program interaction information on the see through display such that the program interaction information corresponds with at least part of the separate apparatus viewable through the see through display based, at least in part, on the identification of the separate apparatus is disclosed.

18 Claims, 10 Drawing Sheets

(56) References Cited

U.S. PATENT DOCUMENTS

| | | | |
|---|---|---|---|
| 2012/0302289 A1* | 11/2012 | Kang | G06F 3/011 455/557 |
| 2013/0069985 A1* | 3/2013 | Wong | G02B 27/017 345/633 |
| 2013/0127980 A1* | 5/2013 | Haddick et al. | 348/14.08 |
| 2013/0278631 A1 | 10/2013 | Border et al. | |
| 2014/0049558 A1* | 2/2014 | Krauss | G06F 3/011 345/633 |
| 2014/0062854 A1* | 3/2014 | Cho | G06F 3/017 345/156 |
| 2014/0285520 A1* | 9/2014 | Park et al. | 345/633 |

OTHER PUBLICATIONS

"Virtual Graffiti," http://en.wikipedia.org/wiki/Virtual_graffiti, Wikipedia, last modified on Mar. 8, 2014, 4 pages.

International Search Report and Written Opinion received in Patent Cooperation Treaty Application No. PCT/FI2014/050992, dated Apr. 14, 2015, 11 pages.

* cited by examiner

CAUSATION OF DISPLAY OF INFORMATION ON A SEE THROUGH DISPLAY

TECHNICAL FIELD

The present application relates generally to causation of display of information on a see through display.

BACKGROUND

As electronic apparatuses play an increasing role in the lives of their users, it has become increasingly desirable to allow for interaction between electronic apparatuses in a way that is intuitive and synergistic. For example, a user may desire to utilize two electronic apparatuses in a way that allows the user to perceive information in a private manner.

SUMMARY

Various aspects of examples of the invention are set out in the claims.

One or more embodiments may provide an apparatus, a computer readable medium, a non-transitory computer readable medium, a computer program product, and a method for receiving visual identification information from a separate apparatus, identifying the separate apparatus based, at least in part, on camera visual information and the visual identification information, determining that the separate apparatus is perceivable through a see through display, and causing display of program interaction information on the see through display such that the program interaction information corresponds with at least part of the separate apparatus viewable through the see through display based, at least in part, on the identification of the separate apparatus.

One or more embodiments may provide an apparatus, a computer readable medium, a computer program product, and a non-transitory computer readable medium having means for receiving visual identification information from a separate apparatus, means for identifying the separate apparatus based, at least in part, on camera visual information and the visual identification information, means for determining that the separate apparatus is perceivable through a see through display, and means for causing display of program interaction information on the see through display such that the program interaction information corresponds with at least part of the separate apparatus viewable through the see through display based, at least in part, on the identification of the separate apparatus.

One or more example embodiments further perform determination that the separate apparatus is no longer perceivable through the see through display, and causation of termination of display of the program interaction information on the see through display based, at least in part, on the determination that the separate apparatus is no longer perceivable through the see through display.

In at least one example embodiment, the determination that the separate apparatus is no longer perceivable through the see through display is based, at least in part, on lack of presence of a representation of the separate apparatus within the camera visual information.

In at least one example embodiment, the determination that the separate apparatus is no longer perceivable through the see through display is based, at least in part, on lack of presence of a representation of the separate apparatus within a predetermined portion of the camera visual information.

In at least one example embodiment, the predetermined portion of the camera visual information corresponds with a user's field of view through the see through display.

In at least one example embodiment, the determination that the separate apparatus is perceivable through the see through display is based, at least in part, on presence of a representation of the separate apparatus within the camera visual information.

In at least one example embodiment, the determination that the separate apparatus is perceivable through the see through display is based, at least in part, on presence of a representation of the separate apparatus within a predetermined portion of the camera visual information.

In at least one example embodiment, the predetermined portion of the camera visual information corresponds with a user's field of view through the see through display.

In at least one example embodiment, the causation of display of program interaction information on the see through display is performed such that the program interaction information overlaps a user's perception of at least part of the separate apparatus.

In at least one example embodiment, the program interaction information is visual information.

In at least one example embodiment, the program interaction information is user interface information.

One or more example embodiments further perform determination of a program based, at least in part, on the identification of the separate apparatus, wherein the program interaction information is associated with the program.

In at least one example embodiment, the identification of the separate apparatus comprises receipt of camera visual information from a camera module, and determination that at least part of the camera visual information comprises a representation of the separate apparatus based, at least in part, on the visual identification information.

One or more example embodiments further perform determination of an orientation of the separate apparatus, wherein the program interaction information is based, at least in part, on the orientation of the separate apparatus.

In at least one example embodiment, the visual identification information is information that indicates a visual characteristic of the separate apparatus.

In at least one example embodiment, the visual characteristic of the separate apparatus is a physical characteristic of the separate apparatus that allows for identification of the separate apparatus.

In at least one example embodiment, the visual identification information is information that is configured to facilitate visual identification of the separate apparatus.

In at least one example embodiment, the visual identification information is information that is being displayed on a display that is comprised by the separate apparatus.

In at least one example embodiment, the visual identification information is a representation of a watch face.

In at least one example embodiment, the visual identification information is a representation of a fiducial marker.

In at least one example embodiment, the fiducial marker is a visual identification marker associated with the separate apparatus that allows for identification of the separate apparatus within the camera visual information.

In at least one example embodiment, the visual identification information is information that indicates an arrangement of at least one light emitting diode.

In at least one example embodiment, the visual identification information is information that indicates a visual characteristic of the light emitting diode.

In at least one example embodiment, the separate apparatus is a watch apparatus that comprises a watch face, and the visual identification information is information indicative of the watch face.

In at least one example embodiment, the visual identification information correlates with a time that is indicated on the watch face.

One or more example embodiments further perform requesting the visual identification information from the separate apparatus, wherein the receipt of the visual identification information is based, at least in part, on the request for the visual identification information.

In at least one example embodiment, the request for the visual identification information is a request for information that is being displayed on a display that is comprised by the separate apparatus.

One or more example embodiments further perform receipt of separate apparatus camera visual information from the separate apparatus, wherein the program interaction information comprises at least part of the separate apparatus camera visual information.

In at least one example embodiment, the program interaction information is associated with a mirror program.

In at least one example embodiment, the separate apparatus camera visual information comprises a visual representation of a user of the separate apparatus.

In at least one example embodiment, the separate apparatus camera visual information is captured by way of a user facing camera module comprised by the separate apparatus.

One or more example embodiments further perform causation of sending a user facing camera capture directive to the separate apparatus.

In at least one example embodiment, the program interaction information is associated with a mirror program, and the causation of sending the user facing camera capture directive to the separate apparatus is based, at least in part, on the mirror program.

In at least one example embodiment, the visual identification information is indicative of a representation of at least a part of the separate apparatus that is perceivable from a position within a capture region of the user facing camera module.

One or more example embodiments further perform receipt of different visual identification information from the separate apparatus, and identification of the separate apparatus based, at least in part, on different camera visual information and the different visual identification information.

One or more example embodiments further perform causation of continuation of display of the program interaction information on the see through display based, at least in part, on the identification of the separate apparatus.

One or more example embodiments further perform determination that the separate apparatus remains perceivable through the see through display.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
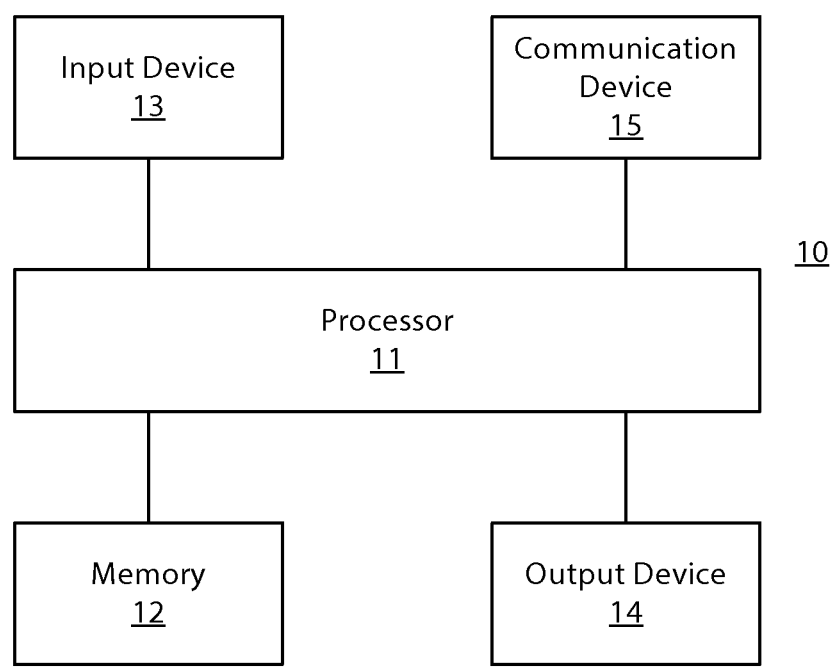
FIG. 1 is a block diagram showing an apparatus according to an example embodiment.

An embodiment of the invention and its potential advantages are understood by referring to FIGS. 1 through 9 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a wearable apparatus, a head worn apparatus, a see through display apparatus, a near eye display apparatus, a wrist worn apparatus, a watch apparatus, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
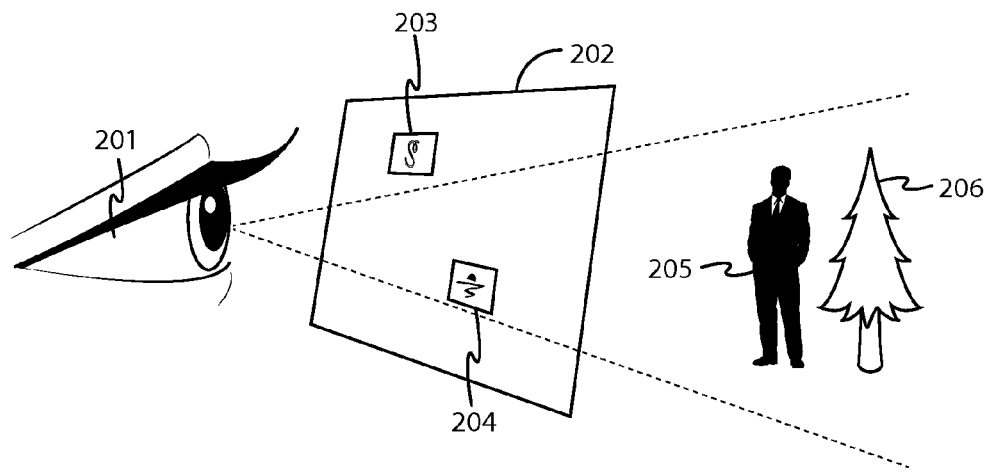
FIGS. 2A-2B are diagrams illustrating see through displays according to at least one example embodiment.
Figure 2B:
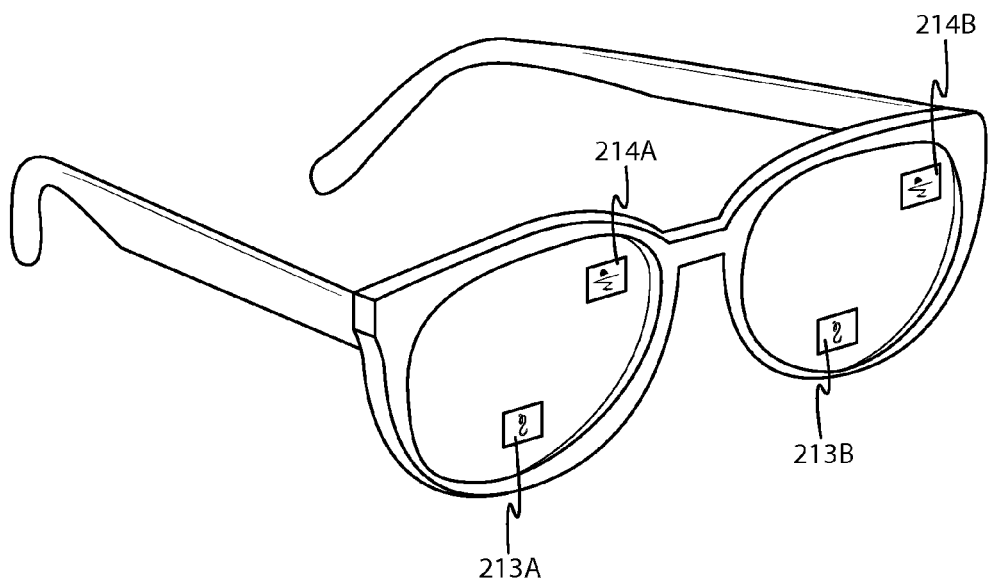

FIGS. 2A-2B are diagrams illustrating see through displays according to at least one example embodiment. The examples of FIGS. 2A-2B are merely examples and do not limit the scope of the claims. For example, configuration of the see through display may vary, relationship between the user and the see through display may vary, shape of the see through display may vary, opacity of the see through display may vary, and/or the like.

In modern times, electronic apparatuses are becoming more prevalent and pervasive. Users often utilize such apparatuses for a variety of purposes. For example, a user may utilize an apparatus to view information that is displayed on a display of the apparatus, to perceive information associated with the user's surroundings on the display of the apparatus, and/or the like. In many circumstances, a user may desire to view information associated with an apparatus in a way that is noninvasive, nonintrusive, discreet, and/or the like. In such circumstances, it may be desirable for a display to be a see through display. In at least one example embodiment, a see through display is a display that presents information to a user, but through which objects on an opposite side of the display from the user may be seen. For example, an object on the opposite side of the display may be perceivable through the see through display. A see through display may be comprised by a window, a windshield, a visor, glasses, a head mounted display, and/or the like. In at least one example embodiment, an apparatus is a head mounted display. A head mounted display may, for example, be a display that is head mountable, a display that is coupled to an element that is wearable at a location on and/or proximate to the head of a user, a display that is wearable at a location on and/or proximate to the head of a user, and/or the like.

FIG. 2A is a diagram illustrating see through display 202 according to at least one example embodiment. In at least one example embodiment, displaying information on a see through display so that the information corresponds with one or more objects viewable through the see through display is referred to as augmented reality. In the example of FIG. 2A, user 201 may perceive objects 205 and 206 through see through display 202. In at least one example embodiment, the see through display may display information to the user. For example, display 202 may display information 203 and information 204. Information 203 and information 204 may be positioned on display 202 such that the information corresponds with one or more objects viewable through see through display 202, such as object 205. For example, information 204 may be displayed at a position on display 202 such that information 204 is aligned with a line of sight between user 201 and object 206. For example, user 201 may perceive information 204 to be overlapping object 206, to partially correspond with object 206 in the user's field of view through display 202, and/or the like. In such an example, information 203 may be associated with, identify, and/or the like, object 205. For example, information 203 may indicate an identity of object 205. In at least one example embodiment, display 202 may be comprised by a head mounted display.

FIG. 2B is a diagram illustrating a see through display according to at least one example embodiment. In at least one example embodiment, a see through display is a near eye display. A near eye display may be a see through display that is positioned proximate to an eye of the user. The example of FIG. 2B illustrates glasses that comprise a near eye display in each lens. In the example of FIG. 2B, the right near eye display is displaying information 213A and 214A, and the left near eye display is displaying information 213B and 214B. In at least one example embodiment, information 213A may be associated with information 213B. For example, the content of information 213A may be identical to content of information 213B. In some circumstances, even though the content may be identical between 213A and 213B, position of information 213A on the right near eye display may vary from position of information 213B on the left near eye display. In this manner, the apparatus may vary position of information between the left near eye display and right near eye display to vary the parallax of the information perceived by the user. In this manner, the apparatus may vary the perceived depth of the information by the user.

Figure 3:
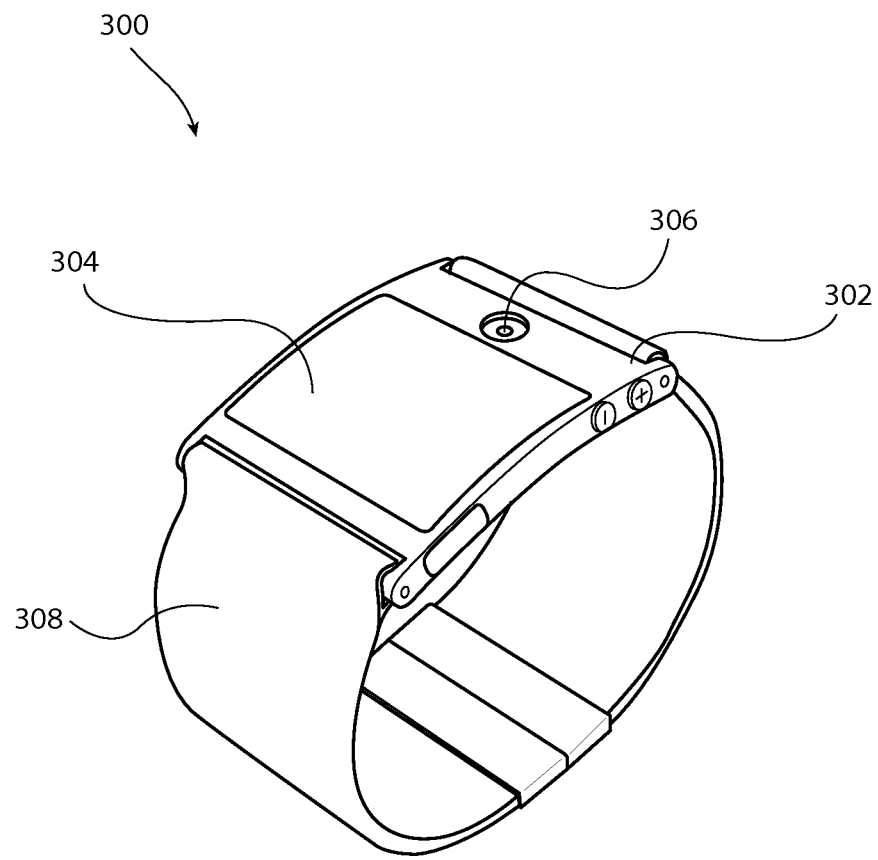
FIG. 3 is a diagram illustrating a wrist worn apparatus according to at least one example embodiment.

FIG. 3 is a diagram illustrating a wrist worn apparatus according to at least one example embodiment. The example of FIG. 3 is merely an example and does not limit the scope of the claims. For example, wrist worn apparatus design may vary, configuration of the wrist worn apparatus may vary, display configuration may vary, and/or the like.

As electronic apparatuses become more prevalent, many users may desire to interact with electronic apparatuses in manners that are intuitive, convenient, accessible, and/or the like. For example, a user may desire to interact with an electronic apparatus that may be unobtrusive to interact with, convenient to interact with, and/or the like. In at least one example embodiment, an apparatus is a wrist worn apparatus. A wrist worn apparatus may be a watch apparatus, a bracelet apparatus, and/or the like. In at least one example embodiment, a wrist worn apparatus comprises a wrist adherence portion. In at least one example embodiment, the wrist adherence portion is a part of the housing of the wrist worn apparatus that is configured to cause the wrist worn apparatus to adhere to a user's wrist, avoid falling from the user's wrist, and/or the like. For example, the wrist adherence portion may be a housing that is configured to at least partially surround a wrist of a wearer of the wrist worn apparatus. In such an example, the wrist adherence portion may be a band, a strap, a bracelet, and/or the like. The wrist adherence portion of the wrist worn apparatus may be rigid, flexible, stretchy, foldable, curvable, deformable, bendable, and/or the like. For example, the wrist adherence portion of the wrist worn apparatus may be a non-curved band that a user can configure such that the non-curved band curves and wraps around the wrist of the user.

In many circumstances, a user may desire to have a wrist worn apparatus to display information. For example, the user may desire the wrist worn apparatus to display information of particular interest to the user, to display visual information that may appeal to the user, and/or the like. In at least one example embodiment, an apparatus comprises a display. The display may be a light emitting diode display, an electronic ink display, a liquid crystal display, an organic light emitting diode display, and/or the like. In at least one example embodiment, a display is coupled with a display housing. In such an example embodiment, the wrist adherence portion of the wrist worn apparatus may be removeably coupled with the display housing, permanently coupled with the display housing, flexibly coupled with the display housing, rigidly coupled with the display housing, and/or the like.

FIG. 3 is a diagram illustrating a wrist worn apparatus according to at least one example embodiment. The example of FIG. 3 depicts wrist worn apparatus 300. In the example of FIG. 3, wrist worn apparatus 300 comprises display housing 302, wrist adherence portion 308, display 304, and camera module 306. As is depicted in FIG. 3, wrist adherence portion 308 is rotatably coupled with display housing 302 on either side of display housing 302. Display 304 and camera module 306 are coupled with display housing 302.

In the example of FIG. 3, wrist adherence portion 308 is a strap that adheres wrist worn apparatus 300 to a user's wrist, such that wrist worn apparatus 300 is secured to the user's wrist and does not fall off of the user's wrist. When worn about the wrist of the user, wrist worn apparatus 300 may be oriented such that display 304 and camera module 306 face in a direction that is generally facing the user, such that the user may perceive information displayed on display 304 of wrist worn apparatus 300, correspond with at least a portion of the camera visual information captured by camera module 306, and/or the like.

Figure 4A:
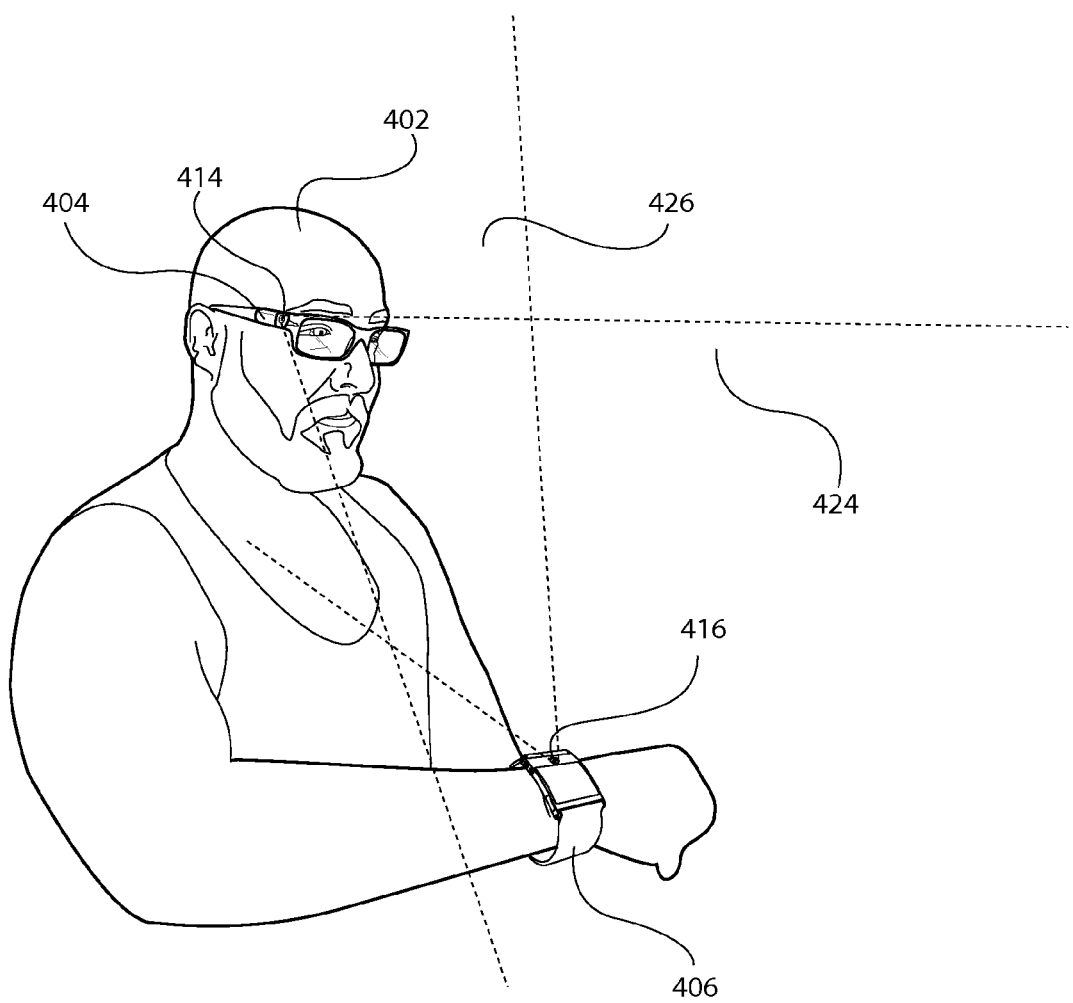
FIGS. 4A-4B are diagrams illustrating use of an apparatus according to at least one example embodiment.
Figure 4B:
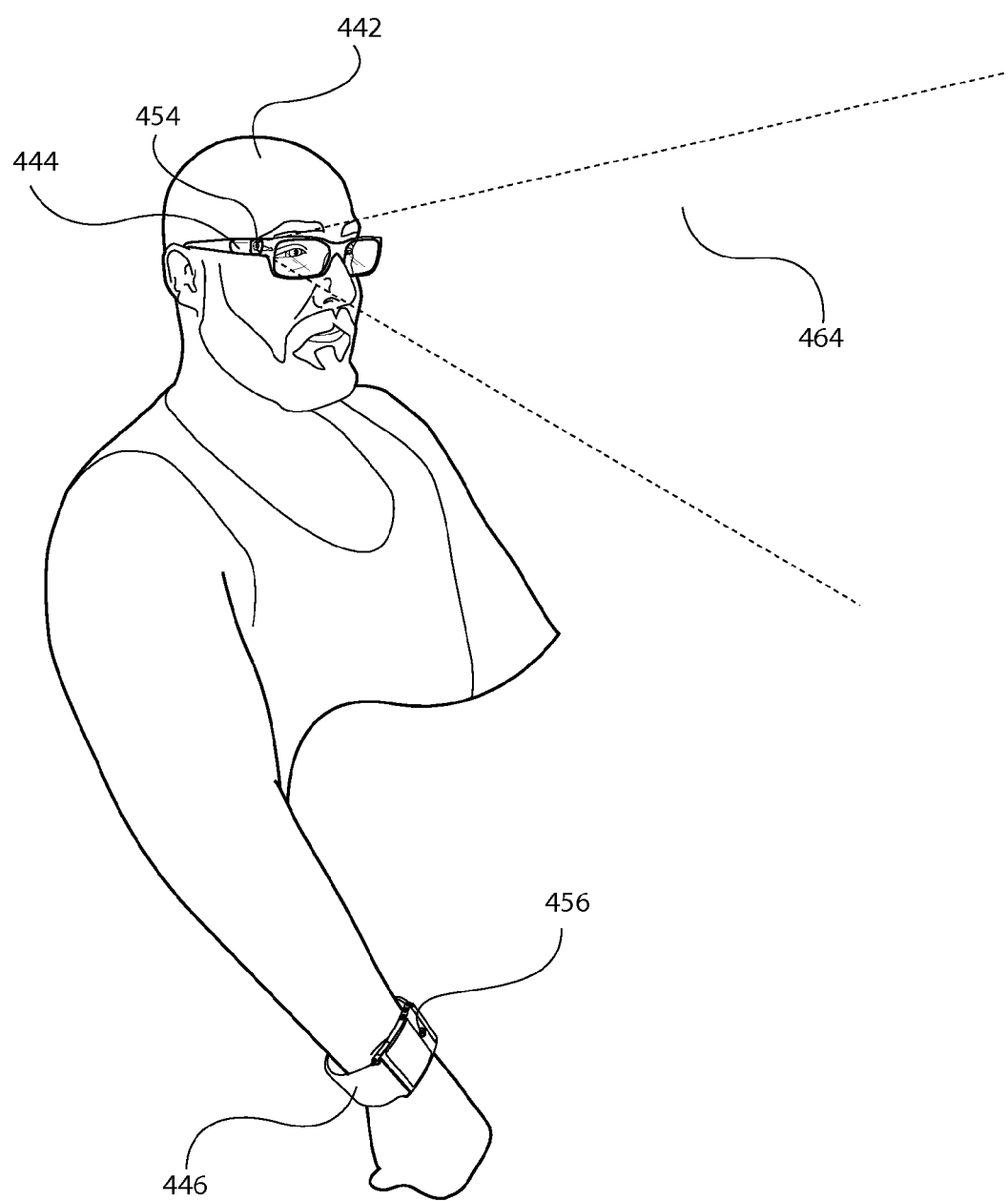

FIGS. 4A-4B are diagrams illustrating use of an apparatus according to at least one example embodiment. The examples of FIGS. 4A-4B are merely examples and do not limit the scope of the claims. For example, apparatus orientation may vary, capture regions may vary, apparatus configuration may vary, and/or the like.

FIG. 4A is a diagram illustrating use of an apparatus according to at least one example embodiment. In the example of FIG. 4A, user 402 is wearing see through display 404 and separate apparatus 406. As depicted in FIG. 4A, see through display 404 comprises camera module 414. Camera module 414 is associated with capture region 424. In the example of FIG. 4A, separate apparatus 406 is a wrist worn apparatus. As depicted in FIG. 4A, separate apparatus 406 comprises camera module 416. Camera module 416 is associated with capture region 426.

As electronic apparatuses become increasingly prevalent, users of electronic apparatuses may desire the ability to utilize more than one electronic apparatus in a synergistic and intuitive manner. For example, a user may often utilize two electronic apparatuses. In such circumstances, it may be desirable for the two electronic apparatuses to communicate with one another, to identify one another, and/or the like. In at least one example embodiment, an apparatus communicates with a separate apparatus by way of a direct communication channel, and indirect communication channel, and/or the like. For example, the apparatus may communicate directly with the separate apparatus via a wireless communication channel, a cellular communication channel, a Bluetooth communication channel, a near field communication channel, and/or the like. In another example, the apparatus may communicate with the separate apparatus by way of one or more intermediate apparatus. The intermediate apparatus may be a server, a router, a gateway, a switch, and/or the like, such that communication between the apparatus and the separate apparatus route through the intermediate apparatus.

In some circumstances, it may be desirable to allow for identification of a separate apparatus by way of visual cues, physical characteristics, and/or the like. A user utilizing an electronic apparatus may desire for the electronic apparatus to identify a different electronic apparatus that the user may be utilizing simultaneously. For example, a user wearing a see through display may desire that the see through display be aware of a separate apparatus that the user is also utilizing, that the user is wearing in addition to the see through display, and/or the like. As discussed previously, a user of a see through display may desire that information displayed via the see through display corresponds with objects that may be visible through the see through display. For example, the user may desire for information associated with such an object be displayed such that the information visually corresponds with the object.

In many circumstances, the object that is perceivable through the see through display may be another of the user's electronic apparatuses. In such circumstances, the user may desire that the see through display be configured such that the see through display may identify the separate apparatus, track a position of the separate apparatus with respect to the user's field of view, and/or the like. In order to facilitate identification of the separate apparatus, it may be desirable to communicate with the separate apparatus for purposes relating to gathering of identification information, receipt of identifying characteristics, and/or the like. In at least one example embodiment, an apparatus identifies a separate apparatus based, at least in part, on visual information indicative of the separate apparatus. For example, the apparatus may identify the separate apparatus based on a physical characteristic of the separate apparatus, a design characteristic of the separate apparatus, a visual cue associated with the separate apparatus, and/or the like. In order to facilitate such visual identification of a separate apparatus, it may be desirable to capture visual information indicative of the separate apparatus. In at least one example embodiment, an apparatus comprises a camera module. The camera module may, for example, capture camera visual information that is within a capture region of the camera module. In at least one example embodiment, identification of the separate apparatus is based, at least in part, on camera visual information. In such an example embodiment, the camera visual information may be received from a camera module comprised by the apparatus, comprised by a separate apparatus, and/or the like. In at least one example embodiment, an apparatus determines that at least part of the camera visual information comprises a representation of the separate apparatus. For example, a separate apparatus may be positioned within a capture region of a camera module such that camera visual information received from the camera module comprises a representation of the separate apparatus. In such an example, an apparatus may identify the separate apparatus based, at least in part, on the representation of the separate apparatus comprised by the camera visual information.

In order to better facilitate visual identification of a separate apparatus, it may be desirable for an apparatus to have knowledge of one or more visual characteristics associated with the separate apparatus. For example, it may be desirable to allow for distinguishment between one or more representations of separate apparatuses within camera visual information. In at least one example embodiment, an apparatus receives visual identification information from a separate apparatus. In at least one example embodiment, the visual identification information is information that indicates a visual characteristic of the separate apparatus. For example, the visual identification information may be information that is configured to facilitate visual identification of the separate apparatus. In at least one example embodiment, visual identification information is information associated with one or more wavelengths within the electromagnetic spectrum. For example, the visual identification information may be associated with visible light, ultraviolet light, infrared light, and/or the like. The visual characteristic of the separate apparatus may be a physical characteristic of the separate apparatus that allows for identification of the separate apparatus. For example, the physical characteristic may be a size, shape, color, texture, pattern, and/or the like that may facilitate identification of the separate apparatus. In at least one example embodiment, the separate apparatus is a watch apparatus that comprises a watch face. In such an example embodiment, the visual identification information may be information indicative of the watch face. For example, the visual identification information may indicate a size of the watch face, a color of the watch face, a style of the numbering on the watch face, and/or the like. In at least one example embodiment, the visual identification information correlates with a time that is indicated on the watch face. For example, the watch face may be an analog watch face that indicates the time via an hour hand and a minute hand. In such an example, the visual identification information may include information regarding a position of the hour hand, a position of the minute hand, and/or the like. For example, the visual identification information may correlate with a physical appearance of the separate apparatus at a specific time of day. If, for example, the time is 10:00 AM, the hour hand and minute hand will be positioned accordingly. In such an example, an apparatus may receive visual identification information from the separate apparatus that indicates the current appearance of the separate apparatus, for example, a visual characteristic of the watch face.

In some circumstances, the visual characteristic of the separate apparatus may relate to visual information that is being displayed by the separate apparatus. For example, the separate apparatus may display a solid blue circle, may display a unique pattern, and/or the like. In at least one example embodiment, the visual identification information is information that is being displayed on a display that is comprised by the separate apparatus. For example, the visual identification information may be a representation of a watch face. For example, a separate apparatus may display a representation of a watch face on a display comprised by the separate apparatus. In such an example, the watch face may be an analog watch face that indicates the time via an hour hand and a minute hand. In such an example, the watch face may indicate that the time is 9:00 AM/PM. In order to facilitate identification of the separate apparatus, it may be desirable for the visual identification information to provide such details regarding the visual characteristics of the watch face. For example, the visual identification information may be a representation of a watch face that indicates that the time is 9:00 AM/PM. In this manner, the separate apparatus may be identified based, at least in part, on correspondence between the visual identification information and the watch face that is displayed on the separate apparatus.

In some circumstances, it may be desirable for the visual identification information to be a unique visual characteristic associated with a particular separate apparatus, to be particularly well suited for visual identification, and/or the like. In some circumstances, a user may utilize a see through display and a separate apparatus. In such circumstances, the user may desire that the user's separate apparatus is distinguishable from a different separate apparatus, from a different user's separate apparatus, and/or the like. As such, it may be desirable to allow for unique visual identification information. In at least one example embodiment, the visual identification information is a representation of a fiducial marker. The fiducial marker may be visual information that is displayed by way of the separate apparatus that allows for identification of the separate apparatus.

In some circumstances, a user may desire to utilize a display of a separate apparatus for purposes unrelated to identification of the separate apparatus. For example, the user may desire to view images on the display of the separate apparatus, may desire to read a notification on the display of the separate apparatus, and/or the like. In such an example, it may be desirable to display visual identification information on the separate apparatus such that the display of the separate apparatus is available for a user to utilize. In at least one example embodiment, the visual identification information is information that indicates an arrangement of at least one light emitting diode. For example, the visual identification information may indicate an arrangement of light emitting diodes such that the light emitting diodes circumnavigate a display of the wrist worn apparatus, an arrangement of light emitting diodes such that the light emitting diodes are positioned in a pattern on a wrist adherence portion of the wrist worn apparatus, and/or the like. In this manner, the arrangement may indicate a two-dimensional arrangement and/or a three-dimensional arrangement of the light emitting diodes, and the arrangement may indicate one or more parts of the separate apparatus to which the light emitting diodes are attached. A light emitting diode may emit visible light, ultraviolet light, infrared light, and/or the like, such that the light is detectable by way of a camera module, an ultraviolet sensor, an infrared sensor, and/or the like.

In at least one example embodiment, the visual identification information is information that indicates a visual characteristic of the light emitting diode. In at least one example embodiment, the visual identification information indicates a state of the light emitting diode. For example, the light emitting diode may be active, inactive, on, off, bright, dim, pulsating, modulating, and/or the like. In at least one example embodiment, the state of the light emitting diode is indicative of a color and/or wavelength of the light being emitted by the light emitting diode. For example, the light emitting diode may be white, blue, red, green, alternating between blue and yellow, dynamically transitioning through the color spectrum, ultraviolet, infrared, and/or the like. For example, the wrist worn apparatus depicted in FIG. 3 may comprise an arrangement of light emitting diodes coupled to display housing 302 such that the light emitting diodes surround display 304, may comprise an arrangement of light emitting diodes coupled to wrist adherence portion 308, and/or the like.

In order to facilitate communication of visual identification information from a separate apparatus to an apparatus, it may be desirable to allow the apparatus to request such visual identification information from a separate apparatus. In at least one example embodiment, an apparatus requests visual identification information from a separate apparatus. In such an example embodiment, the apparatus may receive the visual identification information from the separate apparatus based, at least in part, on the request for the visual identification information. The apparatus may send the request for the visual identification information directly to the separate apparatus, may send the request for the visual identification information to the separate apparatus indirectly by way of one or more intermediate apparatuses, and/or the like. The apparatus may receive the visual identification information directly from the separate apparatus, may receive the visual identification information from the separate apparatus indirectly by way of one or more intermediate apparatuses, and/or the like. In at least one example embodiment, the request for the visual identification information is a request for information that is being displayed on a display that is comprised by the separate apparatus. For example, a separate apparatus may be a watch apparatus, and may display a watch face that indicates the time. In such an example, the apparatus may send a request to the separate apparatus indicative of a request for information that is being displayed on the display of the separate apparatus. In this manner, the apparatus may receive visual identification information that indicates a visual characteristic of the watch face that is being displayed by the separate apparatus, such as the time being display, a style of the watch face being displayed, and/or the like.

In many circumstances, a user may desire to utilize a see through display in tandem with another electronic apparatus. For example, the user may desire to utilize a see through display in tandem with a separate apparatus, such as a wrist worn apparatus, a tablet, a ring apparatus, and/or the like. For example, the user may desire that the see through display and the separate apparatus synergistically interact when the separate apparatus is positioned such that the user perceives the separate apparatus through the user's see through display. In this manner, the see through display may be utilized to display information associated with the wrist worn apparatus, to display information such that the information and the separate apparatus are perceived by the user to be displayed in conjunction with one another, and/or the like. Often times, a user's natural field of view may be broader than a field of view that is perceivable through a see through display. As such, it may be desirable to determine whether a user may perceive a separate apparatus through the user's see through display.

In at least one example embodiment, an apparatus determines that a separate apparatus is perceivable through a see through display. For example, the determination that the separate apparatus is perceivable through the see through display may be based, at least in part, on presence of a representation of the separate apparatus within camera visual information received from a camera module. In such an example, the capture region of the camera module may correspond with a field of view of a user that is peering through a see through display. For example, the capture region of the camera module may be narrower than the user's natural field of view, and may correspond with a portion of an environment that may be perceivable by the user through the see through display. In such an example embodiment, presence of the representation of the separate apparatus at any position within the camera visual information indicates that the user may perceive the separate apparatus through the user's see through display.

In some circumstances, a capture region of a camera module may be wider than a user's natural field of view, may be broader than a field of view that is perceivable by a user through a see through display, and/or the like. In at least one example embodiment, the determination that the separate apparatus is perceivable through the see through display is based, at least in part, on presence of a representation of the separate apparatus within a predetermined portion of the camera visual information. The predetermined portion of the camera visual information may, for example, correspond with a user's field of view through the see through display. In such an example embodiment, presence of the representation of the separate apparatus within the predetermined portion of the camera visual information indicates that the user may perceive the separate apparatus through the user's see through display.

In the example of FIG. 4A, see through display 404 identifies separate apparatus 406 by way of camera visual information received from camera module 414. See through display 404 may receive visual identification information from separate apparatus 406 that indicates visual characteristics of separate apparatus 406. For example, see through display 404 may receive information indicative of a light emitting diode arrangement comprised by separate apparatus 406, may receive information indicative of a watch face being displayed on a display of separate apparatus 406, and/or the like. In order to facilitate identification of separate apparatus 406, see through display 404 may capture camera visual information indicative of capture region 424 by way of camera module 414. In the example of FIG. 4A, see through display 404 identifies separate apparatus 406 based, at least in part, on the camera visual information and the received visual identification information.

In the example of FIG. 4A, separate apparatus 406 is perceivable through see through display 404 by user 402. As depicted in FIG. 4A, separate apparatus 406 is at a position that corresponds within capture region 424 of camera module 414, comprised by see through display 404. Capture region 424 may, for example, correspond with the field of view of user 402 through see through display 404 such that positioning of separate apparatus 406 at a position that corresponds with capture region 424 indicates that separate apparatus 406 is perceivable through see through display 404 by user 402.

FIG. 4B is a diagram illustrating use of an apparatus according to at least one example embodiment. In the example of FIG. 4B, user 442 is wearing see through display 444 and separate apparatus 446. As depicted in FIG. 4B, see through display 444 comprises camera module 454. Camera module 454 is associated with capture region 464. In the example of FIG. 4B, separate apparatus 446 is a wrist worn apparatus. As depicted in FIG. 4B, separate apparatus 446 comprises camera module 456. In the example of FIG. 4B, separate apparatus 456 is not perceivable through see through display 444 by user 442. As depicted in FIG. 4B, separate apparatus 446 is at a position that fails to correspond with capture region 464 of camera module 454, comprised by see through display 444. Capture region 464 may correspond with the field of view of user 442 through see through display 444 such that positioning of separate apparatus 446 at a position that fails to correspond with capture region 464 indicates that separate apparatus 446 is not perceivable through see through display 444 by user 442.

Figure 5A:
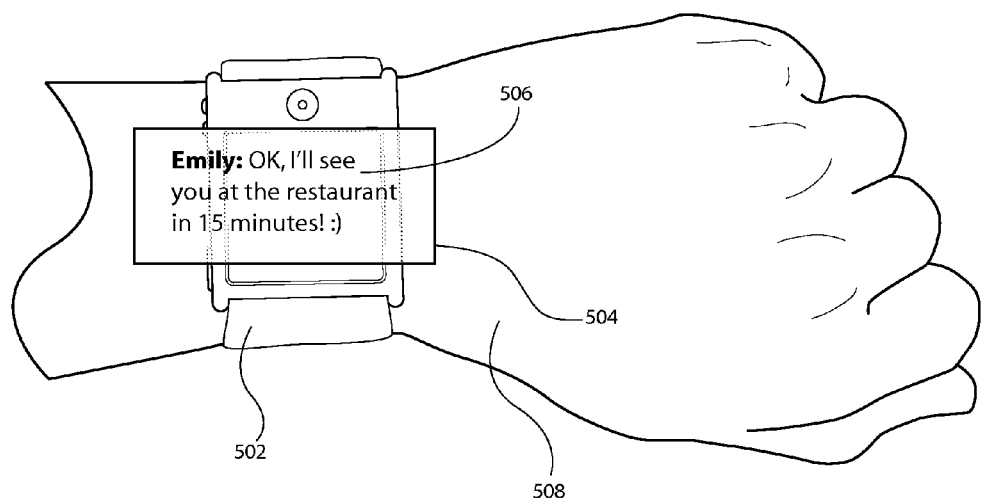
FIGS. 5A-5B are diagrams illustrating display of program interaction information on a see through display according to at least one example embodiment.
Figure 5B:
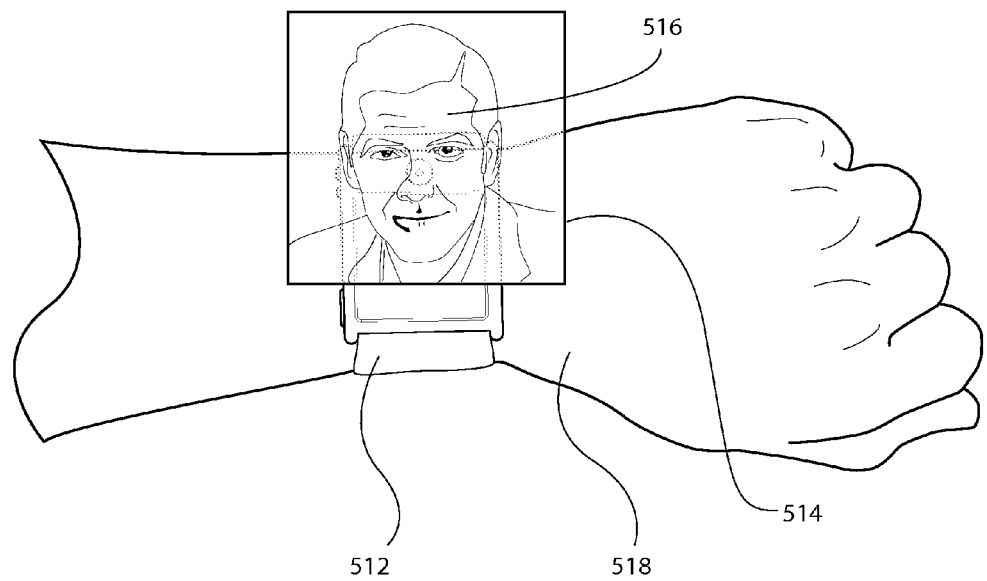

FIGS. 5A-5B are diagrams illustrating display of program interaction information on a see through display according to at least one example embodiment. The examples of FIGS. 5A-5B are merely examples and do not limit the scope of the claims. For example, program interaction information may vary, display orientation may vary, apparatus configuration may vary, and/or the like.

In many circumstances, a user may desire to utilize two or more electronic apparatuses in exciting and intuitive manners. For example, the user may desire to utilize two electronic apparatus in such a way that allows for the user to easily perceive information in a manner that simultaneously enhances the privacy of the user's information. For example, a user may wear a see through display and a wrist worn apparatus. In such an example, the wrist worn apparatus may be utilized for purposes related to display of notifications, display of calendar and/or clock information, display of visual information, and/or the like. In some circumstances, a display comprised by the wrist worn apparatus may be limited in one or more respects. For example, the size of the display may limit the type of information a user may display, may limit the readability of text displayed on the display, and/or the like. In many circumstances, a user may desire to coordinate utilization of the wrist worn apparatus and utilization of the see through display such that the two electronic apparatuses collectively offer an improved user experience.

In some circumstances, a user may desire to view visual information by way of the user's see through display and separate apparatus. For example, the user may desire to perceive visual information displayed on the user's see through display in conjunction with the user's wrist worn apparatus. In at least one example embodiment, the program interaction information is visual information. For example, the program interaction information may be textual information, video information, image information, graphical information, and/or the like. For example, the program interaction information may be a text notification, an email, an image, a video, and/or the like. In some circumstances, a user may desire additional interactivity between the user's see through display and separate apparatus. For example, the user may desire to access an enhanced user interface by way of the user's see through display and separate apparatus. In at least one example embodiment, the program interaction information is user interface information. User interface information may be information that facilitates a user's operation of and interactions with an apparatus, a separate apparatus, and/or the like.

In some circumstances, a user may desire to interact with a specific program that may be associated with the user's apparatus, a separate apparatus, and/or the like. In at least one example embodiment, program interaction information is associated with a program. In such an example embodiment, the apparatus may determine the program based, at least in part, on the identification of the separate apparatus, on the visual identification information, and/or the like. For example, a program on a separate apparatus may be associated with visual identification information, and a different program on the separate apparatus may be associated with different visual identification information. In such an example embodiment, an apparatus may receive visual identification information from a separate apparatus, and identify the separate apparatus and the program associated with the separate apparatus based, at least in part, on the visual identification information.

In some circumstances, a user may desire to control the information displayed on a see through display in association with a separate apparatus by way of the separate apparatus. In at least one example embodiment, an apparatus identifies a separate apparatus by way of visual identification information. In such an example embodiment, the apparatus may determine an orientation of the separate apparatus based, at least in part, on camera visual information that comprises a representation of the separate apparatus. For example, the visual identification information may indicate various representations of the separate apparatus that correspond with various orientations of the separate apparatus. In this manner, correspondence between the representation of the separate apparatus comprised by the camera visual information and indicated in the visual identification information indicates that the orientation of the separate apparatus corresponds with the orientation indicated by the visual identification information.

In at least one example embodiment, an apparatus determines an orientation of the separate apparatus. In such an example embodiment, the program interaction information may be based, at least in part, on the orientation of the separate apparatus. For example, the separate apparatus may be a wrist worn apparatus. In such an example, the apparatus may determine that the wrist worn apparatus is oriented in an orientation that indicates that the display of the wrist worn apparatus is facing a user of the wrist worn apparatus, and that the user's wrist and forearm are positioned parallel to the user's torso. For example, the orientation may indicate that the user desires to check the time. In such an example, the apparatus may associate the orientation with a clock program, and cause display of clock program interaction information. In another example, the apparatus may determine that the wrist worn apparatus is oriented in an orientation that indicates that the display of the wrist worn apparatus is facing away from the user of the wrist worn apparatus, and that the user's forearm is facing the user. For example, the orientation may indicate that the user is looking at a portion of the wrist worn apparatus that is opposite of the display of the wrist worn apparatus. In such an example, the apparatus may associate the orientation with a calendar program, and cause display of calendar program interaction information. The orientation of the separate apparatus may cause certain actions to occur with respect to the separate apparatus and/or the see through display, may indicate a user desire to interact with a specific program associated with the separate apparatus and/or the see through display, may indicate user input in relation to a user interface associated with the separate apparatus and/or the see through display, and/or the like.

FIG. 5A is a diagram illustrating display of program interaction information on a see through display according to at least one example embodiment. The example of FIG. 5A depicts separate apparatus 502 as perceived through a see through display. In the example of FIG. 5A, separate apparatus 502 is a wrist worn apparatus worn by user 508. In the example of FIG. 5A, see through display portion 504 is displaying program interaction information 506. See through display portion 504 is a part of the see through display that is displaying program interaction information 506. In the example of FIG. 5A, program interaction information 506 is a textual notification that is only perceivable by user 508 by way of the see through display. For example, the display comprised by separate apparatus 502 may be inactive, may display a home screen, may display a watch face, may display a fiducial marker, may display visual identification information, and/or the like. In the example of FIG. 5A, the see through display worn by user 508 identifies separate apparatus 502 based, at least in part, on camera visual information and visual identification information received from separate apparatus 502.

In at least one example embodiment, an apparatus causes display of program interaction information on a see through display such that the program interaction information corresponds with at least part of a separate apparatus that is viewable through the see through display based, at least in part, on the identification of the separate apparatus. In such an example embodiment, correspondence between the display of the program interaction information and the separate apparatus indicates that a user of the see through display perceives the program interaction information at a position within the user's field of view that corresponds with a position of the separate apparatus within the user's field of view. For example, the program interaction information may be displayed at a position on the see through display that corresponds with the intersection of the see through display and the user's line of sight to the separate apparatus. For example, FIG. 5A depicts separate apparatus 502 as perceived by user 508 through a see through display. As can be seen in the example of FIG. 5A, program interaction information 506 is displayed on the see through display such that program interaction information 506 overlaps at least a portion of wrist worn apparatus 502, and is perceived by user 508 to be displayed proximate to wrist worn apparatus 502. In the example of FIG. 5A, if user 508 were to reorient his wrist and/or move his arm around, program interaction information 506 will remain proximate to wrist worn apparatus 502 when viewed through the see through display. For example, program interaction information 506 is displayed on see through display portion 504. See through display portion 504 corresponds with the line of sight between user 508 and wrist worn apparatus 502. For example, see through display portion 504 is located at a position on the see through display that corresponds with the intersection of the see through display and the user's line of sight to wrist worn apparatus 502.

In this manner, the program interaction information displayed via the see through display is perceived by the user to be spatially connected to and/or displayed in proximity with the separate apparatus, as viewed through the see through display. In at least one example embodiment, the causation of display of program interaction information on the see through display is performed such that the program interaction information overlaps a user's perception of at least part of the separate apparatus through the see through display.

In many circumstances, a user may desire to utilize the user's electronic apparatuses for personal reasons. For example, the user may desire to utilize one or more electronic apparatuses to capture images, capture video, view images, view video, and/or the like. In some circumstances, a user may desire to view a representation of herself. For example, the user may desire to check her hair, apply make-up, indulge in vanity, and/or the like. The user may, however, desire to do so in a manner that is as intuitive as is it discrete. In at least one example embodiment, an apparatus receives separate apparatus camera visual information from a separate apparatus. In such an example embodiment, the program interaction information displayed by way of the see through display may be associated with a mirror program, and may comprise at least part of the separate apparatus camera visual information. In at least one example embodiment, the separate apparatus camera visual information comprises a visual representation of the user of the separate apparatus. The separate apparatus camera visual information may be captured by way of a user facing camera module comprised by the separate apparatus. For example, as illustrated in FIG. 3, wrist worn apparatus 300 comprises camera module 306. In the example of FIG. 3, camera module 306 is a user facing camera module. The capture region of camera module 306 of FIG. 3 may correspond with at least part of the user of wrist worn apparatus 300. In such an example, the visual representation of the user may be based, at least in part, on visual information captured by camera module 306 and received from wrist worn apparatus 300.

In at least one example embodiment, an apparatus causes sending a user facing camera capture directive to the separate apparatus. For example, an orientation of the separate apparatus may indicate that the user desires to view a representation of herself by way of a mirror application, the user facing camera comprised by the separate apparatus, and the see through display worn by the user. For example, the program interaction information may be associated with a mirror program, and the causation of sending the user facing camera capture directive to the separate apparatus may be based, at least in part, on the mirror program. For example, a user of a see through display and a wrist worn apparatus may indicate a desire to view a representation of herself. Based, at least in part, on this indication, the see through display may send a user facing camera capture directive to the wrist worn apparatus, causing the wrist worn apparatus to capture user facing camera visual information comprising a representation of the user. The see through display may receive the user facing camera visual information from the separate apparatus, and display the user facing camera visual information in relation to the program interactive information on the see through display. As such, the user of the see through display may perceive the user facing camera visual information such that the user facing camera visual information appears to be tied to the user's wrist worn apparatus. In this manner, reorientation of the user's wrist and/or the wrist worn apparatus may result in a change in the angle of the representation of the user, and a repositioning of the user facing camera visual information on the display such that the user facing camera visual information continues to correspond with the wrist worn apparatus.

FIG. 5B is a diagram illustrating display of program interaction information on a see through display according to at least one example embodiment. The example of FIG. 5B depicts separate apparatus 512 as perceived through a see through display. In the example of FIG. 5B, separate apparatus 512 is a wrist worn apparatus worn by user 518. In the example of FIG. 5B, see through display portion 514 is displaying program interaction information 516. See through display portion 514 is a part of the see through display that is displaying program interaction information 516. In the example of FIG. 5B, program interaction information 516 is visual information that is only perceivable by user 518 by way of the see through display. For example, the display comprised by separate apparatus 512 may be inactive, may display a home screen, may display a watch face, may display a fiducial marker, may display visual identification information, and/or the like. In the example of FIG. 5B, the see through display worn by user 518 identifies separate apparatus 512 based, at least in part, on camera visual information and visual identification information received from separate apparatus 512. Based, at least in part, on this identification of separate apparatus 512, the see through display causes display of program interaction information 516 at a position that corresponds with see through display portion 514. In the example of FIG. 5B, program interaction information 516 is associated with a mirror program, and depicts a representation of user 518.

In some circumstances, it may be desirable to permit dynamic identification of a separate apparatus based, at least in part, on varying visual identification information. For example, a separate apparatus may display dynamic visual identification information on the display of the separate apparatus. For example, the visual identification information may be a clock face. In such an example, it may be desirable to allow for the identification of the separate apparatus in a manner that accounts for the various hour hand position, minute hand positions, indicated time, and/or the like. In such an example, it may be desirable to permit identification of the separate apparatus despite the dynamic nature of the visual identification information. In at least one example embodiment, an apparatus receives different visual identification information from the separate apparatus. In such an example embodiment, the apparatus may identify the separate apparatus based, at least in part, on different camera visual information and the different visual identification information. For example, an apparatus may initially receive visual identification information indicating that an analog watch face that is displayed on a display of the separate apparatus indicates that the time is 9:00 AM/PM. After a minute has elapse, the analog watch face may indicate that the time is 9:01 AM/PM. As such, the visual identification information has changed from that which was initially received by the apparatus. In such an example, the apparatus may receive different visual identification information from the separate apparatus that indicates the change to the display visual identification information. In such an example embodiment, the apparatus may determine that the separate apparatus remains perceivable through the see through display, and cause continuation of display of the program interaction information on the see through display based, at least in part, on the identification of the separate apparatus.

In some circumstances, a separate apparatus may not be perceivable through a see through display. For example, the separate apparatus may be moved from a position at which the separate apparatus is perceivable through the see through display to a different position at which the separate apparatus is no longer perceivable through the see through display. For example, the separate apparatus may be a wrist worn apparatus, and the user may move her wrist from in front of her body to her side. In such an example, the user may desire discontinuation of display of any information caused to be displayed on the see through display in conjunction with the wrist worn apparatus. In at least one example embodiment, an apparatus determines that the separate apparatus is no longer perceivable through the see through display. In such an example embodiment, the apparatus may cause termination of display of program interaction information on the see through display based, at least in part, on the determination that the separate apparatus is no longer perceivable through the see through display. The determination that the separate apparatus is no longer perceivable through the see through display may be based, at least in part, on lack of presence of a representation of the separate apparatus within the camera visual information, on lack of presence of a representation of the separate apparatus within a predetermined portion of the camera visual information, and/or the like. For example, the program interaction information displayed in FIG. 5B may have been caused to be displayed by separate apparatus 406 of FIG. 4A. As shown in the example of FIG. 4A, user 402 is within capture region 426 of camera module 416 comprised by separate apparatus 406. In the example of FIG. 4A, separate apparatus 406 is perceivable by user 402 through see through display 404. The example of FIG. 4B illustrates the scenario of FIG. 4A subsequent to user 402 lowering his arm to the position shown in FIG. 4B. In the example of FIG. 4B, separate apparatus 446 corresponds with separate apparatus 406 of FIG. 4A. In the example of FIG. 4B, separate apparatus 446 is no longer perceivable by user 442 through see through display 444. As such, see through display 444 may terminate display of program interaction information, such as program interaction information 516 of FIG. 5B, previously displayed.

In some circumstances, a user may desire continuation of display of information displayed on a see through display in conjunction with a separate apparatus despite the separate apparatus no longer being perceivable through the see through display. For example, the user may be wearing a see through display and may move a separate apparatus to a position such that the separate apparatus is perceivable through the see through display and program interaction information is caused to be displayed on the see through display. Subsequently, the separate apparatus may be moved to a different position at which the separate apparatus is no longer perceivable through the see through display. In such circumstances, the user may desire continuation of display of the program interaction information for a specified duration, a predetermined amount of time, and/or the like. In at least one example embodiment, display of the program interaction information persists at a most recent position of the separate apparatus corresponding with the separate apparatus being perceivable through the see through display. For example, the separate apparatus may move leftward and downward such that the separate apparatus is no longer perceivable through the see through display. In such an example, the apparatus may cause continuation of display of program interaction information at a position corresponding with the lower left quadrant of the see through display based, at least in part, on the separate apparatus moving out of view in the lower left quadrant of the see through display. In such an example, if the separate apparatus is moved to another position such that the separate apparatus is again perceivable through the see through display, display of the program interaction information is transitioned from the most recent position of the separate apparatus corresponding with the separate apparatus being perceivable through the see through display to the other position. The transition may, for example, animate the movement of display of the program interaction information to the other position such that user perceives the program interaction information moving to a position on the see through display that corresponds with the perception of the separate apparatus through the see through display.

Figure 6:
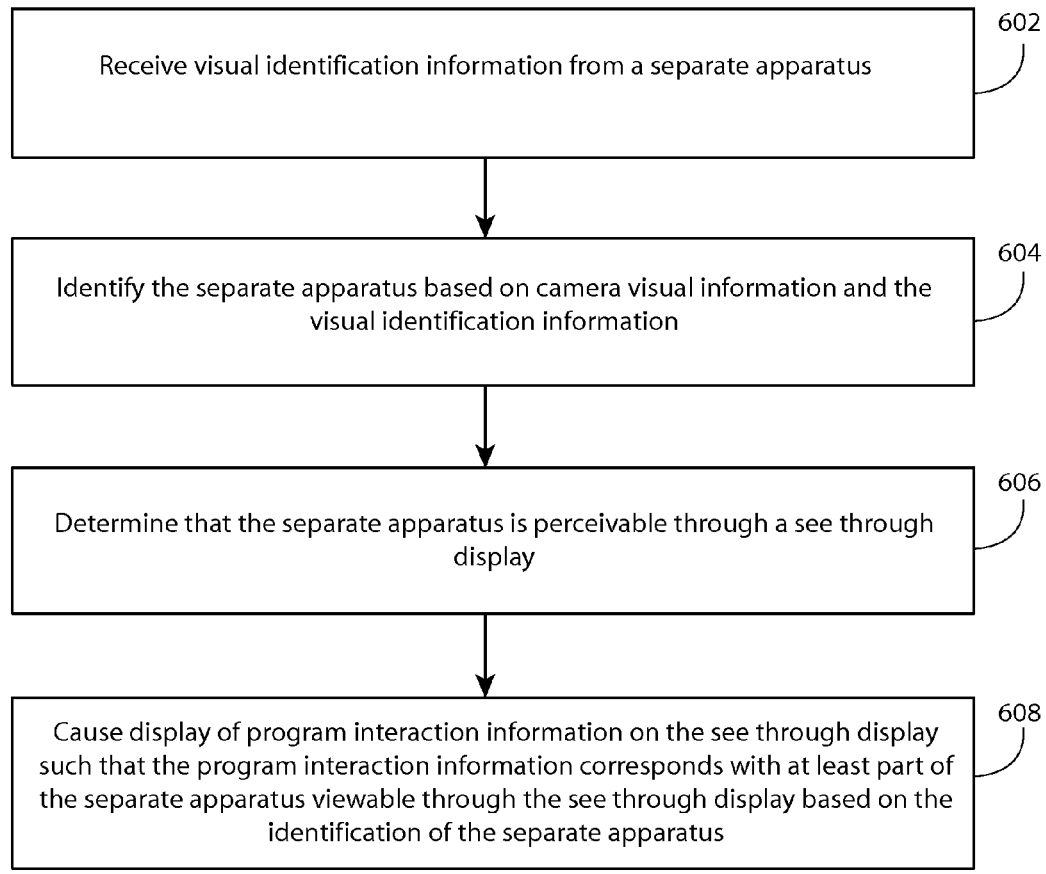
FIG. 6 is a flow diagram illustrating activities associated with causation of display of program interaction information on a see through display according to at least one example embodiment.

FIG. 6 is a flow diagram illustrating activities associated with causation of display of program interaction information on a see through display according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus receives visual identification information from a separate apparatus. The receipt, the visual identification information, and the separate apparatus may be similar as described regarding FIG. 2, FIG. 3, FIGS. 4A-4B, and FIGS. 5A-5B.

At block 604, the apparatus identifies the separate apparatus based, at least in part, on camera visual information and the visual identification information. The identification and the camera visual information may be similar as described regarding FIG. 2, FIG. 3, and FIGS. 4A-4B.

At block 606, the apparatus determines that the separate apparatus is perceivable through a see through display. The determination and the see through display may be similar as described regarding FIG. 2, FIG. 3, and FIGS. 4A-4B.

At block 608, the apparatus causes display of program interaction information on the see through display such that the program interaction information corresponds with at least part of the separate apparatus viewable through the see through display based, at least in part, on the identification of the separate apparatus. The display, the causation of display, the program interaction information, and the correspondence between the program interaction information and the separate apparatus may be similar as described regarding FIG. 2, FIG. 3, FIGS. 4A-4B, and FIGS. 5A-5B.

Figure 7:
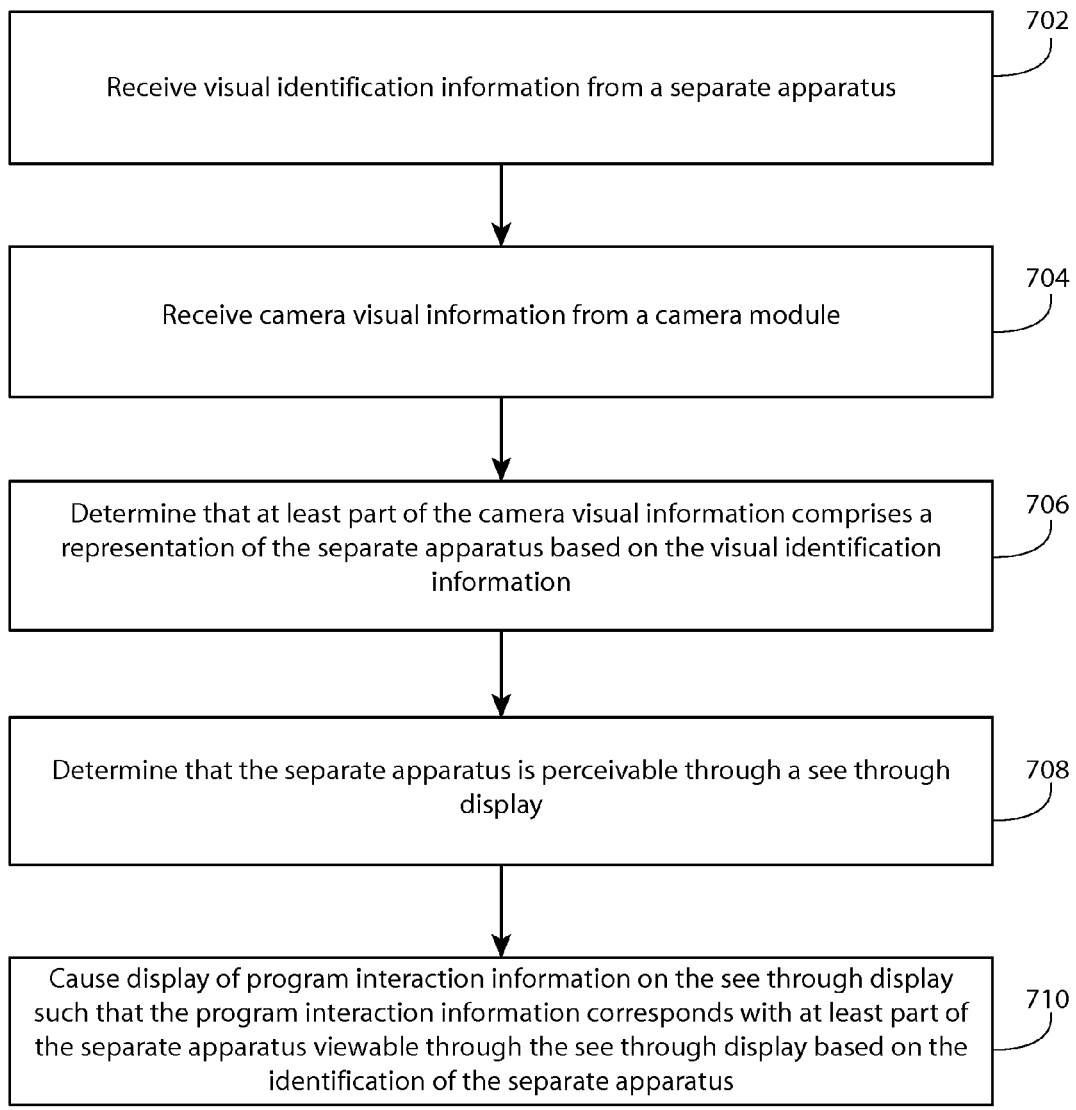
FIG. 7 is a flow diagram illustrating activities associated with causation of display of program interaction information on a see through display according to at least one example embodiment.

FIG. 7 is a flow diagram illustrating activities associated with causation of display of program interaction information on a see through display according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As discussed previously, in some circumstances, it may be desirable to identify a separate apparatus based, at least in part, on camera visual information. In such circumstances, it may be desirable to receive the camera visual information from a camera module, and determine whether the camera visual information comprises a representation of the separate apparatus.

At block 702, the apparatus receives visual identification information from a separate apparatus. The receipt, the visual identification information, and the separate apparatus may be similar as described regarding FIG. 2, FIG. 3, FIGS. 4A-4B, and FIGS. 5A-5B.

At block 704, the apparatus receives camera visual information from a camera module. The receipt, the camera visual information, and the camera module may be similar as described regarding FIG. 2, FIG. 3, and FIGS. 4A-4B.

At block 706, the apparatus determines that at least part of the camera visual information comprises a representation of the separate apparatus based, at least in part, on the visual identification information. The determination, the part of the camera visual information, and the representation of the separate apparatus may be similar as described regarding FIG. 2, FIG. 3, and FIGS. 4A-4B.

At block 708, the apparatus determines that the separate apparatus is perceivable through a see through display. The determination and the see through display may be similar as described regarding FIG. 2, FIG. 3, and FIGS. 4A-4B.

At block 710, the apparatus causes display of program interaction information on the see through display such that the program interaction information corresponds with at least part of the separate apparatus viewable through the see through display based, at least in part, on the identification of the separate apparatus. The display, the causation of display, the program interaction information, and the correspondence between the program interaction information and the separate apparatus may be similar as described regarding FIG. 2, FIG. 3, FIGS. 4A-4B, and FIGS. 5A-5B.

Figure 8:
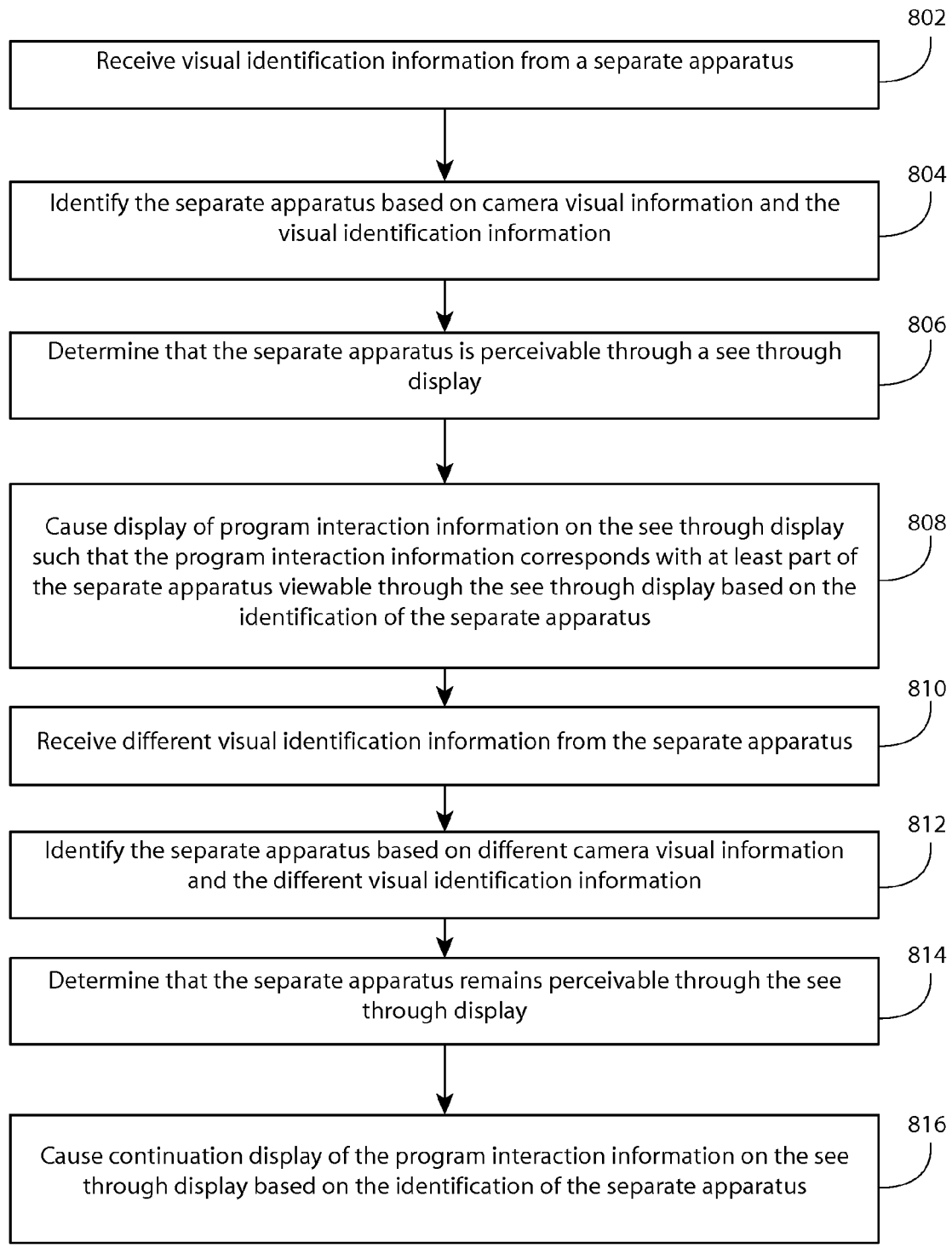
FIG. 8 is a flow diagram illustrating activities associated with causation of continuation of display of program interaction information on a see through display according to at least one example embodiment.

FIG. 8 is a flow diagram illustrating activities associated with causation of continuation of display of program interaction information on a see through display according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As discussed previously, in many circumstances, a user may desire to perceive program interaction information that is displayed on a see through display while the user's separate apparatus is perceivable through the see through display. In such circumstances, the user may desire to continually display the program interaction information while the separate apparatus is perceivable through the see through display.

At block 802, the apparatus receives visual identification information from a separate apparatus. The receipt, the visual identification information, and the separate apparatus may be similar as described regarding FIG. 2, FIG. 3, FIGS. 4A-4B, and FIGS. 5A-5B.

At block 804, the apparatus identifies the separate apparatus based, at least in part, on camera visual information and the visual identification information. The identification and the camera visual information may be similar as described regarding FIG. 2, FIG. 3, and FIGS. 4A-4B.

At block 806, the apparatus determines that the separate apparatus is perceivable through a see through display. The determination and the see through display may be similar as described regarding FIG. 2, FIG. 3, and FIGS. 4A-4B.

At block 808, the apparatus causes display of program interaction information on the see through display such that the program interaction information corresponds with at least part of the separate apparatus viewable through the see through display based, at least in part, on the identification of the separate apparatus. The display, the causation of display, the program interaction information, and the correspondence between the program interaction information and the separate apparatus may be similar as described regarding FIG. 2, FIG. 3, FIGS. 4A-4B, and FIGS. 5A-5B.

At block 810, the apparatus receives different visual identification information from the separate apparatus.

At block 812, the apparatus identifies the separate apparatus based, at least in part, on different camera visual information and the different visual identification information.

At block 814, the apparatus determines that the separate apparatus remains perceivable through the see through display.

At block 816, the apparatus causes continuation of display of program interaction information on the see through display such that the program interaction information corresponds with at least part of the separate apparatus viewable through the see through display based, at least in part, on the identification of the separate apparatus.

Figure 9:
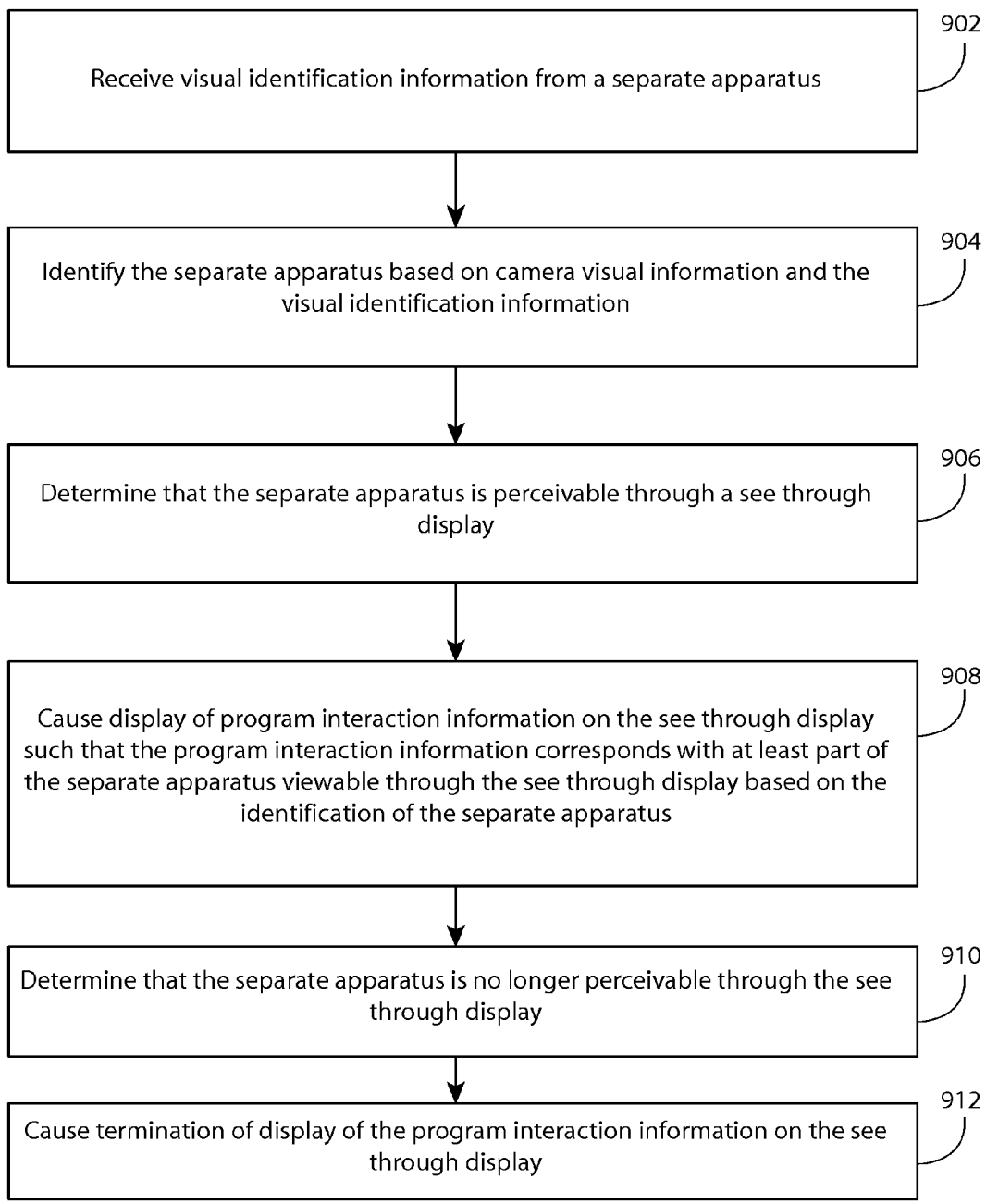
FIG. 9 is a flow diagram illustrating activities associated with causation of termination of display of program interaction information on a see through display according to at least one example embodiment.

FIG. 9 is a flow diagram illustrating activities associated with causation of termination of display of program interaction information on a see through display according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As discussed previously, in some circumstances, a user may desire to discontinue display of program interaction information on the user's see through display at a position within the user's field of view that corresponds with the user's separate apparatus. For example, the user may move the separate apparatus such that the separate apparatus is no longer perceivable through the see through display, may glance in a direction that fails to correspond with a location of the separate apparatus, and/or the like. In such circumstances, the user may desire to cause termination of display of the program interaction information on the see through display based, at least in part, on a determination that the separate apparatus is no longer perceivable through the see through display.

At block 902, the apparatus receives visual identification information from a separate apparatus. The receipt, the visual identification information, and the separate apparatus may be similar as described regarding FIG. 2, FIG. 3, FIGS. 4A-4B, and FIGS. 5A-5B.

At block 904, the apparatus identifies the separate apparatus based, at least in part, on camera visual information and the visual identification information. The identification and the camera visual information may be similar as described regarding FIG. 2, FIG. 3, and FIGS. 4A-4B.

At block 906, the apparatus determines that the separate apparatus is perceivable through a see through display. The determination and the see through display may be similar as described regarding FIG. 2, FIG. 3, and FIGS. 4A-4B.

At block 908, the apparatus causes display of program interaction information on the see through display such that the program interaction information corresponds with at least part of the separate apparatus viewable through the see through display based, at least in part, on the identification of the separate apparatus. The display, the causation of display, the program interaction information, and the correspondence between the program interaction information and the separate apparatus may be similar as described regarding FIG. 2, FIG. 3, FIGS. 4A-4B, and FIGS. 5A-5B.

At block 910, the apparatus determines that the separate apparatus is no longer perceivable through the see through display.

At block 912, the apparatus causes termination of display of the program interaction information on the see through display based, at least in part, on the determination that the separate apparatus is no longer perceivable through the see through display.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 702 of FIG. 7 may be performed after block 704 of FIG. 7. Furthermore, if desired, one or more of the above-described functions may be optional or may be combined. For example, block 606 of FIG. 6 may be optional and/or combined with block 604 of FIG. 6.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;
   at least one memory including computer program code, the memory and the computer program code configured to, working with the processor, cause the apparatus to perform at least the following:
   receipt, from a separate apparatus, of information that indicates a visual characteristic of the separate apparatus, wherein the information that indicates the visual characteristic comprises information that is being displayed on a display of the separate apparatus;
   subsequent to the receipt of the information that indicates the visual characteristic, receipt of camera visual information from a camera module;
   determination, based at least in part on the information that indicates the visual characteristic, that at least part of the camera visual information corresponds to the visual characteristic;
   identification of the separate apparatus based, at least in part, on the determination that the camera visual information corresponds to the visual characteristic;
   determination, based at least in part on the identification of the separate apparatus, that at least part of the separate apparatus is viewable through a see through display; and
   causation of display, on the see through display, of program interaction information, such that the program interaction information corresponds with the at least part of the separate apparatus viewable through the see through display.

2. The apparatus of claim 1, wherein the separate apparatus is a watch apparatus that comprises a watch face, and the information that indicates the visual characteristic comprises information that is indicative of the watch face.

3. The apparatus of claim 1, wherein the memory includes computer program code configured to, working with the processor, cause the apparatus to perform transmission, to the separate apparatus, of a request for the information that indicates the visual characteristic of the separate apparatus.

4. The apparatus of claim 1, wherein the memory includes computer program code configured to, working with the processor, cause the apparatus to perform receipt, from the separate apparatus, of separate apparatus camera visual information recorded by a camera of the separate apparatus, wherein the program interaction information comprises at least part of the separate apparatus camera visual information.

5. The apparatus of claim 1, wherein the memory includes computer program code configured to, working with the processor, cause the apparatus to perform:
   receipt, from the separate apparatus, of information that indicates a different visual characteristic of the separate apparatus;
   subsequent to the receipt of the information that indicates the different visual characteristic, receipt of different camera visual information from the camera module;
   determination that at least part of the different camera visual information corresponds to the different visual characteristic; and
   identification of the separate apparatus based, at least in part, on the determination that the different camera visual information corresponds to the different visual characteristic.

6. The apparatus of claim 1, wherein the memory includes computer program code configured to, working with the processor, cause the apparatus to perform:
   determination that the separate apparatus is no longer viewable through the see through display; and
   causation of termination of display, on the see through display, of the program interaction information, based at least in part on the determination that the separate apparatus is no longer viewable through the see through display.

7. A method comprising:
   receiving, from a separate apparatus, information that indicates a visual characteristic of the separate apparatus, wherein the information that indicates the visual characteristic comprises information that is being displayed on a display of the separate apparatus;
   subsequent to the receipt of the information that indicates the visual characteristic, receiving camera visual information from a camera module;
   determining, based at least in part on the information that indicates the visual characteristic, that at least part of the camera visual information corresponds to the visual characteristic;
   identifying the separate apparatus based, at least in part, on the determination that the camera visual information corresponds to the visual characteristic;
   determining, based at least in part on the identification of the separate apparatus, that at least part of the separate apparatus is viewable through a see through display; and
   causing display, on the see through display, of program interaction information, such that the program interaction information corresponds with at least part of the separate apparatus viewable through the see through display.

8. The method of claim 7, wherein the separate apparatus is a watch apparatus that comprises a watch face, and the information that indicates the visual characteristic of the separate apparatus comprises information that is indicative of the watch face.

9. The method of claim 7, further comprising receiving, from the separate apparatus, separate apparatus camera visual information recorded by a camera of the separate apparatus, wherein the program interaction information comprises at least part of the separate apparatus camera visual information.

10. The method of claim 7, further comprising:
    determining that the separate apparatus is no longer viewable through the see through display; and
    causing termination of display, on the see through display, of the program interaction information based at least in part on the determination that the separate apparatus is no longer viewable through the see through display.

11. The method of claim 7, further comprising transmitting, to the separate apparatus, a request for the information that indicates the visual characteristic of the separate apparatus.

12. The method of claim 7, further comprising:
    receiving, from the separate apparatus, information that indicates a different visual characteristic of the separate apparatus;

subsequent to the receipt of the information that indicates the different visual characteristic, receiving different camera visual information from the camera module;

determining that at least part of the different camera visual information corresponds to the different visual characteristic; and identifying the separate apparatus based, at least in part, on the determination that the different camera visual information corresponds to the different visual characteristic.

13. The method of claim 7, wherein the determining that at least part of the camera visual information corresponds to the visual characteristic comprises identifying, in the camera visual information, the information that is being displayed.

14. At least one non-transitory computer-readable medium encoded with instructions that, when executed by a processor, perform:

receiving, from a separate apparatus, information that indicates a visual characteristic of the separate apparatus, wherein the information that indicates the visual characteristic comprises information that is being displayed on a display of the separate apparatus;

subsequent to the receipt of the information that indicates the visual characteristic, receiving camera visual information from a camera module;

determining, based at least in part on the information that indicates the visual characteristic, that at least part of the camera visual information corresponds to the visual characteristic;

identifying the separate apparatus based, at least in part, on the determination that the camera visual information corresponds to the visual characteristic;

determining, based at least in part on the identification of the separate apparatus, that at least part of the separate apparatus is viewable through a see through display; and causing display, on the see through display, of program interaction information, such that the program interaction information corresponds with at least part of the separate apparatus viewable through the see through display.

15. The medium of claim 14, wherein the separate apparatus is a watch apparatus that comprises a watch face, and the information that indicates the visual characteristic comprises information that is indicative of the watch face.

16. The medium of claim 14, further encoded with instructions that, when executed by the processor, perform transmitting, to the separate apparatus, a request for the information that indicates the visual characteristic of the separate apparatus.

17. The medium of claim 14, further encoded with instructions that, when executed by the processor, perform:

receiving, from the separate apparatus, information that indicates a different visual characteristic of the separate apparatus;

subsequent to the receipt of the information that indicates the different visual characteristic, receiving different camera visual information from the camera module;

determining that at least part of the different camera visual information corresponds to the different visual characteristic; and identifying the separate apparatus based, at least in part, on the determination that the different camera visual information corresponds to the different visual characteristic.

18. The medium of claim 14, further encoded with instructions that, when executed by the processor, perform:

determining that the separate apparatus is no longer viewable through the see through display; and causing termination of display, on the see through display, of the program interaction information based at least in part on the determination that the separate apparatus is no longer viewable through the see through display.

* * * * *